(12) United States Patent
Lazik et al.

(10) Patent No.: US 8,551,224 B2
(45) Date of Patent: Oct. 8, 2013

(54) DEVICE AND METHOD FOR REMEDIATING AND SEPARATING GAS ACCUMULATIONS IN WATERWAYS

(75) Inventors: Detlef Lazik, Salzatal/Schiepzig (DE); Dieter Lazik, Beetzsee (DE); Matthias Remmler, Wurzen (DE)

(73) Assignees: Detlef Lazik, Salzatal/Schiepzig (DE); Dieter Lazik, Beetzsee (DE)

( * ) Notice: Subject to any disclaimer, the term of this patent is extended or adjusted under 35 U.S.C. 154(b) by 205 days.

(21) Appl. No.: 13/126,826

(22) PCT Filed: Oct. 29, 2009

(86) PCT No.: PCT/EP2009/064259
§ 371 (c)(1),
(2), (4) Date: Aug. 17, 2011

(87) PCT Pub. No.: WO2010/049474
PCT Pub. Date: May 6, 2010

(65) Prior Publication Data
US 2011/0265649 A1  Nov. 3, 2011

(30) Foreign Application Priority Data

Oct. 30, 2008 (DE) .......................... 10 2008 043 329

(51) Int. Cl.
*B01D 19/00* (2006.01)

(52) U.S. Cl.
USPC .............. 95/247; 95/266; 96/193; 210/747.5; 210/170.11

(58) Field of Classification Search
USPC ..................... 95/247, 248, 249, 266; 96/193, 96/194; 210/747.5, 170.11, 170.09
See application file for complete search history.

(56) References Cited

U.S. PATENT DOCUMENTS

| | | | | |
|---|---|---|---|---|
| 6,254,667 | B1 * | 7/2001 | Saito et al. ...................... | 95/254 |
| 2003/0214175 | A1 | 11/2003 | Baciu | |
| 2005/0072301 | A1 * | 4/2005 | Baciu .............................. | 95/258 |
| 2009/0223365 | A1 * | 9/2009 | Morkel ............................ | 95/30 |
| 2011/0064644 | A1 * | 3/2011 | McAlister ................. | 423/445 R |

FOREIGN PATENT DOCUMENTS

| | | |
|---|---|---|
| DE | 19906147 | 8/2000 |
| JP | 05004039 | 1/1993 |
| WO | WO 2005/088071 | 9/2005 |

OTHER PUBLICATIONS

International Search Report dated Mar. 1, 2010.

* cited by examiner

*Primary Examiner* — Duane Smith
*Assistant Examiner* — Douglas Theisen
(74) *Attorney, Agent, or Firm* — VLP Law Group LLP

(57) ABSTRACT

A pipe system comprising i) an exploratory pipe extracting a fluid containing gas from waterways, ii) an injection pipe returning fluid depleted of gas and iii) a plurality of gas traps, wherein I) the gas traps are connected to the exploratory pipe and to the injection pipe such that the fluid is transferred from the exploratory pipe through the gas traps to the injection pipe, II) the gas traps disposed at specific distances vertically one above the other and relative to the fluid deposits to be depleted and connected together such that rising fluid passes from the exploratory pipe to a first gas trap located at a first pressure level at which a first gas/gas mixture is separated, whereupon depleted fluid passes to a second gas trap at a predefined pressure level in which a second gas/gas mixture is separated, wherein the first pressure and the second pressure are different from one another, and III) the gas traps are connected to one or more gas extraction devices.

12 Claims, 2 Drawing Sheets waterway waterway

DEVICE AND METHOD FOR REMEDIATING AND SEPARATING GAS ACCUMULATIONS IN WATERWAYS

PRIORITY CLAIM

This is a U.S. national stage of application No. PCT/EP2009/064259, filed on Oct. 29, 2009. Priority is claimed on the following application: German Application No.: 102008043329.2, filed on Oct. 30, 2008, the content of which is incorporated here by reference.

BACKGROUND OF THE INVENTION

1. Technical Field

The invention relates to devices and methods for depleting dissolved gases and for separating the gas phase from gas-water phase mixtures from waterways as well as the use of these devices and methods.

2. State-of-the-Art

The last 200 years of global industrial development have led to a drastic exploitation of fossil energy sources generated during geologic history. A large number of the worldwide deposits of crude oil, gas and coal will be depleted in the foreseeable future. Nevertheless, the energy demand of the world population has an undiminished progressive trend (Hawksworth, J.: The World in 2050. Can rapid global growth be reconciled with moving to a low carbon economy?, *PricewaterhouseCoopers LLP*—July 2008. 1-21).

The exploitation of methane hydrate deposits discovered at the shelf edges, i.e., at a large depth, is currently not yet practiced due to different aspects, such as for example the tremendous demands on the technology or the high recovery-related risk of spontaneous outgassing effects with global relevance for the climate (Zhang, Y., Kling, G. W.: Dynamics of Lake Eruptions and Possible Ocean Eruptions. *Annu. Rev. Earth Planet. Sci.* 2006.34: 293-324).

In addition to technologies which are so far not in existence and would allow the use of gaseous raw materials residing in waterways, such "deposits" can also represent risks.

The climatic development of the earth confirms global warming independent of the discussion of the underlying causes. Recent geological discoveries support a new theory which explains unchallenged the short-term global extinction of the species on earth. In contrast to meteor impacts, volcanic eruptions, etc., this theory bases the extinction on the hypothesis of massive $H_2S$-outgassing of the oceans (Berner, R. A.: Plants, $H_2S$, $CO_2$, $O_2$ and the Permo-Triassic Extinction. 2006 Philadelphia Annual Meeting (22-25 Oct. 2006) Philadelphia, Pa., Paper No. 137-9). The mechanisms of the associated phase separation are known. The key mechanism is generally coupled to global warming. The triggers for such eruptive phase separations can be of different in nature, for example volcanic eruptions, phase-separation-related (methane) gas eruptions, anthropogenic greenhouse effect, etc. The illustrated mechanism has already been observed in smaller waterways (example of already significant size: latest fish extinction in the Baltic Sea). The phase-separation-driven lake eruptions are known from different lakes in Africa and have caused terrible catastrophes (Zhang, Y., Kling, G. W.: Dynamics of Lake Eruptions and Possible Ocean Eruptions. *Annu. Rev. Earth Planet. Sci.* 2006. 34: 293-324).

The controlled reduction in the concentration of climate-relevant gases in deep waterways would reduce the risk of ocean gas eruptions and the introduction of climate-relevant gases into the atmosphere. At the same time, the available gas storage capacity of the oceans would also tend to be increased.

An efficient process could allow such a reduction depending on the quantity of gas present and its composition as a cost-effective remediation or also as a profitable exploration of the gas deposit "Ocean."

One problem with the recovery of gases from waterways is that, driven by the pressure and phase density differences, a continuous gas phase separation and the enrichment of the gas-water phase mixture are highly nonlinear processes which can occur in a self-reinforcing manner (in open waters also explosively) and therefore place high demands on material and extraction technology and are associated with high accident risks. Zhang & Kling describe the free buoyancy-related movement of a developing gas phase in waterways and its movement in a pipe as a process with positive feedback. The beginning of the degassing causes a decrease in the density of the mixture, and hence buoyancy. Due to the rise of the gas-water mixture, regions with lower ambient pressure are reached, causing the pressure in the gas-water mixture to decrease further, thus releasing additional gas. A methane gas-water mixture may cause an explosive rise in spite of the low solubility of methane in water. Higher solubilities, for example for $CO_2$ or $H_2S$, result in a significantly stronger feedback. Zhang & Kling estimate the velocity at which to center of a methane bubble cloud ($1\%_{Mass}$ $CH_4$) reaches the water surface from 500 m depth at 130 m/s. The velocity maximum still reaches 62 m/s for $0.1\%_{Mass}$. In this case, $0.1\%_{Mass}$ $CH_4$ under standard conditions corresponds to approximately 22.4 L/mole*1 g $(CH_4)$/16 g/mole=1.4 L. Such gas-water phase mixture is at the water surface volumetrically composed of approximately one half gas phase (phase fraction of 0.58). The mechanical energy density $1/2\, \rho v^2 = \rho g h$ results in a height of the gas mixture in the order of $h = v^2/(2\,g) \approx 10^2$ m and thus causes an explosive discharge at the water surface.

It is an object of the present invention to alleviate or solve one or several of the aforementioned problems.

SUMMARY OF THE INVENTION

Solution According to the Invention

For purpose of abbreviation, the water which absorbs the dissolved gases and possibly the gas phase will be referred to as a fluid.

The object is attained by providing a device for depleting gases from waterways, comprising:
a pipe system which includes
i) an exploration pipe for receiving the fluid containing the gas,
ii) an injection pipe for returning the fluid depleted of the gas, and
iii) at least one gas trap which is arranged in the device such that a selected pressure can be generated in the gas trap, wherein the gas trap is functionally connected with both the exploration pipe and the injection pipe such that the fluid can be transferred from the exploration pipe via the gas trap into the injection pipe and the gas trap is configured so as to be functionally connectable with a gas receiving device;
characterized in that
the pipe system has a plurality of gas traps, wherein
I) the gas traps are connected with both the exploration pipe and the injection pipe such that the fluid can be transferred from the exploration pipe via the gas traps into the injection pipe, II) the gas traps are arranged at certain distances vertically on top of one another and relative to the fluidic deposit to be depleted and are functionally connected with one another such that the fluid rising from the exploration pipe reaches a first gas trap having a pressure level at which a first gas or gas mixture is separated, subsequently the enriched fluid reaches a second gas trap which also has a predetermined pressure level and in which a second gas/gas mixture is separated, wherein the first pressure and the second pressure are different from each other, and III) the individual gas traps are each functionally connectable with one or several gas receiving devices or the gas traps in one or more groups are connectable with a common gas receiving device.

During the operation of the device, one opening of the exploration pipe is lowered into the fluidic deposit of the waterway for entrance of the fluid and preferably receives the fluid continuously in the device. The fluid is transported via the exploration pipe to a gas trap located above the deposit. Due to the pressure dependence of the gas solubility, a gas phase separation from the fluid results. The released gaseous phase is separated in the gas trap, for example, by gravity. The flow conditions of the fluid in the gas trap are optimized with respect to the gas phase separation. To this end, the surface of the fluid entering the gas trap can be maximized by using suitable devices (e.g., through atomization or flow across a porous body or grid). A sump through which the exiting fluid is transported allows the formation of a calm water zone from which a possibly entrained residual gas phase can outgas. The depleted water is then discharged via the injection pipe to a predetermined depth and pressed in.

The device according to the invention can also have a controllable system which is functionally connected with the pipe system such that a selected dynamic pressure can be generated in the pipe system and hence also a controllable flow from the exploration pipe through the gas trap to the injection pipe. The controllable system can be configured so that a selected dynamic pressure can be adjusted by controlling the system in the pipe system. The controllable system can be a passive system, which allows control of the dynamic pressure by changing the cross-section at least one location of the pipe system. A preferred passively controllable system is a sleeve which is functionally connected with the device such that the diameter can be tapered at least one location in the pipe system, preferably in the exploration pipe. The controllable system can also be an active system. A preferred actively controllable system is a turbine. The device according to the invention can also have several controllable systems, wherein different controllable systems may be arranged in a single device.

The controllable system produces a desired dynamic pressure in the pipe system. This can be achieved in a passive system, for example, by a suitable reduction of the cross-section in the pipe system. Preferably, the controllable system is a turbine. The turbine can optionally be used during the startup phase to set the fluid flow in motion. After the fluid flow has commenced, the fluid flow runs preferably automatically due to the buoyancy-driven phase separation, by generating usable flow energy. In this state, the turbine can be used, for example, for controlling the fluid volume flow, optimizing the separation of the gases inside the gas trap, or limiting the mechanical load on the device caused by the buoyancy-related fluid motion. The turbine hereby controls a dynamic pressure in the pipe system. This can be achieved in that the turbine absorbs a part of the mechanical energy and converts it into electrical energy for use. The controllable turbine power and the adjustable relative height of the gas trap above the fluidic deposit allow adjustment of optimal conditions for the pressure and the fluid residence time in the gas trap. These conditions can be selected and adjusted so that only certain gases or gas mixtures are separated from the fluid and/or that only a certain quantity is separated from a certain gas, selected gas mixture or all dissolved gases and/or that almost complete outgassing occurs. The gas trap can be connected with a gas receiving device configured to receive and clean the separated gases and/or supply them to other uses. The device according to the invention may be connected with an exploration or processing platform located on the water surface or on land. Such a platform may be movable, for example a ship, or may be locally anchored, for example a drilling platform-like facility, or may be fixedly anchored in the ground or the sea bed. The platform may include additional devices, for example a gas receiving device, a device for converting mechanical energy into electrical or chemical energy and/or additional devices for further processing and separation of pre-depleted gases.

The exploration pipe for receiving the fluid and the injection pipe for returning the depleted water can be constructed from telescopic pipes which can be lowered to predetermined depths. The pipes may also be entirely or partially nested, allowing the exploration pipe to be guided inside the injection pipe (or vice versa). The pipes can be arranged so as to be alternatively rotatable and/or pivotable in relation to each other and their geometries can be adapted to the specific condition of the deposit. In a preferred embodiment, at least one part of the pipe system is coated with a hydrophobic material, preferably with Teflon.

The inside of the exploration pipe(s), grids which are optionally installed in the entrance opening(s), but also the turbine wheels, maybe coated with a hydrophobic material (optional), for example with a Teflon-containing material. Components of the gas trap relevant for the separation may also be hydrophobically coated. The hydrophobic material can be applied in structured form, for example in form of surfaces having micro-pores or hair on the side facing the water. When using such surfaces, gas separation can preferably occur on the hydrophobic surface under selected conditions or the separation velocity can be increased after initiation, for example when the concentration of at least one gas-phase-forming dissolved gas is close to the saturation concentration and the hydrostatic pressure allows the phase separation of at least this gas.

In addition, the flow-related pressure drop across a porous body in the pipe system can simultaneously or additionally accelerate outgassing. The porous body can simultaneously fulfill a filter function. Examples for such porous body are a porous plate, bulk solids and/or hydrophobic suspended matter entrained in the fluid flow. Alternatively or in combination, membranes can be used in the same context (e.g., hydrophobic filter or polymer molecules) for phase separation, wherein the gas-specific separation efficiency of the device can be further increased by using gas-selective membranes. Corresponding membranes are known to a person skilled in the art. Preferably, the porous body has at least one hydrophobic surface. Preferably, the porous body is located in a region upstream of the gas trap which can be determined based on the gas. However, the porous body can also be located at any other location in the pipe system through which fluid flows and which is not located downstream of the last gas trap, or it can completely fill the exploration pipe up to the gas trap.

DETAILED DESCRIPTION OF THE PRESENTLY PREFERRED EMBODIMENTS

Figure 1:
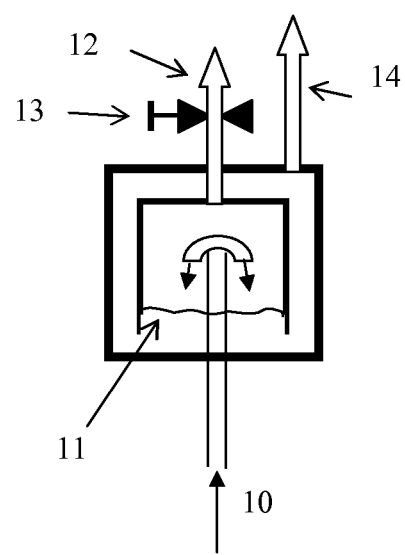
FIG. 1 a schematic diagram of a gravity-fed gas trap

The device has at least one gas trap which is functionally connected with both the exploration pipe and the injection pipe such that water can be transferred from the exploration pipe via the gas trap into the injection pipe. Within the context of the invention, the term "gas trap" refers to any device suitable for separating a gas phase produced from a gas-fluid mixture by phase separation, which is now to be separated from the fluid phase. The gas trap is hereby arranged in the device so as to allow generation of a selective pressure in the gas trap. According to the invention, several conventional methods, as well as combinations thereof, can be used for gas phase separation. FIG. 1 shows in form of an example a gravity-fed gas trap. The arrows with the closed heads indicate the movement direction of the upward-flowing phase mixture 10. The phase mixture 10 enters the separation space of the gas trap above the gas-water boundary surface 11. A pipe 12 for a discharging the separated gas or gas mixture is located on the ceiling of the separation space. Discharge of the separated gas from the separation chamber of the gas trap through the pipe 12 may be controllable, for example with a gas separation valve 13. The depleted fluid moves from the gas trap into the phase mixture line 14 and can optionally be supplied to another gas trap having different pressure conditions for separating other gases or gas mixtures.

Alternatively or in combination, membranes (e.g., hydrophobic filter modules or polymer modules) can be employed for gas phase separation, whereby the gas-specific separation efficiency can be further increased through use of gas-selective membranes. Corresponding membranes are known to a person skilled in the art. The gas trap can be optimized for maximum gas separation by way of the materials used for its construction, the definable flow paths of the fluid and/or the generation of local pressure gradients (by using hydrodynamic effects on apertures, baffle plates, etc.) The gas trap may be connected with a gas receiving device.

The optimum pressure drop up to the gas trap can be produced by defining the height of the gas trap above the fluidic deposit to be depleted. In addition, the pressure drop up to the gas trap can be varied and controlled by a dynamic pressure in the pipe system produced by a controllable system, e.g. a turbine. The pressure in the gas trap $p_g$ can be represented in simplified form by the following relationship:

$$p_g = p_d - p_a + \rho_w g h_w + p_{atm}, \text{ wherein}$$

| | |
|---|---|
| $p_g$ | the pressure in the gas trap, |
| $p_{atm}$ | atmospheric pressure, |
| $p_a$ | the pressure of the fluid column causing the buoyancy (due to the reduced phase mixture density compared to the density of water), |
| $p_d$ | the flow-related dynamic pressure in the pipe system in the region of the gas trap |
| $\rho_w$ $g h_w$ | the hydrostatic pressure depending on the height difference to the water surface of the waterway. This pressure becomes zero when the gas trap is positioned exactly at the height of the water surface, is a positive when the gas trap is arranged below the water surface and becomes negative above the water surface (suspended water column in the injection pipe). |

The dynamic pressure in the pipe system must be optimized for the performed process because of the pressure dependence of the fluid density (gas density proportional to the ambient pressure, outgassing gas quantity indirectly proportional to the ambient pressure), the complicated flow conditions of the phase mixture and the intended separation of gas in the gas trap. It can be concluded from the above equation that by specifying the height $h_w$ at which the gas trap is positioned, an upper pressure limit for the gas pressure $p_g$ is reached, above which the flow in the pipe system stops. Independent, easily controllable criteria for process optimization are thus available.

For example, the suspended fluid column (index "f") in the injection pipe below the gas trap may be stabilized by suctioning the released gases with a vacuum pump having the gas trap pressure $p_g = p_{atm} - \rho_f g h_f = p_{atm} - \rho_w g h_w$, wherein $\rho_w g h_w$ is the suspended water column that is equivalent to the suspended fluid column.

For example, the gas trap has suitable height of above the deposit, if a pressure is produced in the gas trap where a desirable gas and/or gas mixture is already in the gas phase, wherein undesirable gases occur still secondarily in the gas phase.

In principle, such conditions can be thermodynamically calculated for slowly advancing processes. The rapidly advancing process according to the method is controlled by complicated limiting fluidic and kinematic conditions for outgassing. Different factors, such as flow characteristic, flow path, local pressure conditions, gas inventory and concentrations, type of the phase transitions, local heating, reactions, phase boundaries (size, geometry, interactions), containment characteristics and geometry, temperature can neither be parameterized nor are theoretical models available which would allow a sufficiently precise calculation. Consequently, there is a need for controlling the separated gases and regulating the ambient pressure conditions up to the respective gas trap. These dependencies are known to a person skilled in the art who would have no problem to adjust the system by suitable process control of the separated gases and/or pressures so that the desirable and gases and/or gas mixtures are efficiently separated.

Preferably, the gas trap includes a controllable gas separation valve. If the device has several gas traps, then one, several or all gas traps may each have one or several gas separation valves. Compressors (technically available, for example, for pressures up to 1500 bar; optionally cooled), which compress the gas/gas mixture to a selectable nominal pressure, may be arranged downstream of the gas separation valve(s), wherein advantageously only the respective difference pressure between the gas trap pressure and the nominal pressure for the respective gas flow must be overcome. The nominal pressure can be adjusted based on vapor pressure curves, so that $CO_2$ and $H_2S$ are condensed from the gas mixture aside from defined residual partial pressures, gravimetrically separated and transported onward as a liquid.

Preferably, the device has at least one gas trap which is located at a level below the water surface. However, several or all gas traps may also be arranged below the water surface.

If the device has several gas traps, then the gas traps can be arranged in the pipe system such that i) the gas traps are functionally connected with both the exploration pipe and the injection pipe such that the fluid can be transferred from the exploration pipe via the gas traps into the injection pipe, ii) the gas traps are arranged with certain distances vertically on top of one another and relative to the fluidic deposit to be depleted such that the rising fluid from the exploration pipe reaches a first gas trap at a first pressure level where a first gas or gas mixture is separated, subsequently the depleted fluid reaches a second gas trap which is again at a predetermined pressure level where a second gas/gas mixture is separated, wherein the first pressure and second pressure are different from each other, and iii) the individual gas traps can each be functionally connected with one or several gas receiving devices or can be connected in one or several groups with a common gas receiving device.

Different arrangements of several gas traps and/or of several devices according to the invention can therefore be cascaded dependent on the application. For example, a stationary effect encompassing the space above geogenic/anthropogenic outgassing systems can be implemented through parallel operation of several vertical cascades or by erecting pyramid structures.

Figure 2:
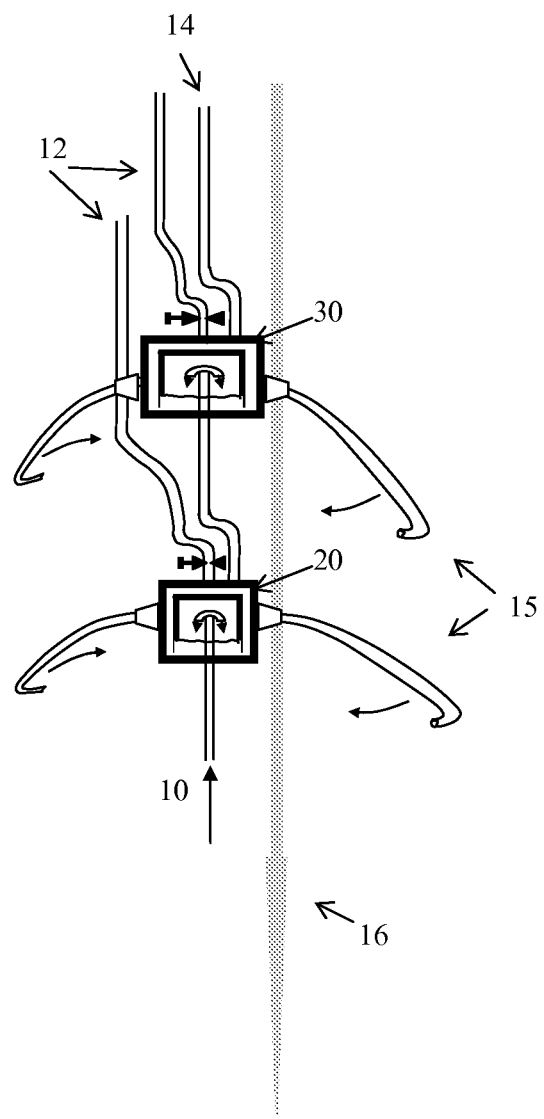
FIG. 2 schematic diagram of a cascaded phase separation system with a gas separation and reinjection line for water and a pressure line for $CO_2$.

FIG. 2 shows schematically the structure of a device according to the invention with cascaded gas phase separation. Shown is a detail of such device with two gravity-fed gas traps 20 and 30 arranged above one another, wherein the first gas trap 20 is positioned at a depth so that conditions exist in this gas trap under which a first defined in gas and/or gas mixture can be separated, and the second gas trap 30 is positioned at a depth so that conditions exist in the second gas trap 30 under which a second defined in gas and/or gas mixture can be separated. The conditions in the first gas trap 20 and the second gas trap 30 differ from one another, so that the separated gases and/or gas mixtures are different from each other. Both gas traps 20, 30 have each gas lines 12 with gas separation valves for discharging the respective separated gas or gas mixture. The two gas traps 20 and 30 may include water suction systems 15 which may be arranged adjustably and/or rotatably. The water suction systems are used to replenish water in the device according to the invention and can also be formed, for example, as water jet pumps driven by the rising water, and may optionally be provided with controllable and/or adjustable shutoff valves. The two gas traps 20 and 30 are connected with each other via phase mixture lines 14 such that the phase mixture depleted by the first gas or gas mixture can exit the first gas trap 20 and is supplied to the second gas trap 30 for separating therein a second gas or gas mixture. After completion of all cascades and/or gas traps of the device according to the invention, the depleted fluid and/or undesirable gases, such as $CO_2$, are returned via an injection pipe 16 and optionally pressed in at a suitable depth. The injection pipe 16 may be designed, for example, for anchoring the device according to the invention.

The technical possibility of a cascaded gas phase separation (see FIG. 2) provides an effective variant for gas separation with economical consequences, because for sufficiently deep fluidic deposits of the required energy is provided by the waterway itself.

The following pressure- and temperature-dependent separation mechanisms are hereby combined at staggered heights:

The phase separation of dissolved gases and solvent (fluid) having a concentration which due to pressure reduction or temperature increase exceeds the individual saturation concentrations. The rise in the exploration pipe causes continuous phase separation after exceeding the saturation concentration; this effect is determined in particular by the pressure dependence of the saturation concentrations.

For supercritical gases, this phase separation results in a height-dependent formation of a gas phase which can be affected by the properties of the flow (e.g., turbulence) and of the vessel system (e.g., porous body, hydrophobic surfaces), wherein the gas phase increases in volume up to the gas trap where it is separated.

For gases having a critical temperature (see Table 1) above the defined fluid temperature, the phase separation causes segregation of gas and fluid, wherein the gas aggregates in from of droplets and forms in conjunction with the fluid a common fluidic mixed phase, which passes through the gas trap, while the vapor pressure of the respective gas adapts to the gas phase which may have already been formed by the other gases. The ratio of attained vapor pressure to gas phase pressure determines the contamination of the gas mixture by the evaporating gas.

The fluidic gas phase evaporates completely from the mixed phase only after the pressure is additionally reduced to a gas-dependent critical pressure. The evaporation kinetics and the vapor pressure of the developing gas phase depend on the pressure and temperature, while the kinetics additionally depends on the size and the properties of the phase boundaries (solid-fluid-fluid) and the phase dynamics.

Due to the evaporation of the liquid gas phase and optionally as a result of occurring reactions, heat can be removed from the fluid. The effect can be used for cooling the compressors or can be buffered by the surrounding water with a suitable design of the exploration pipes (e.g., large heat transfer surfaces to the surrounding waterway, high thermal conductivity of the vessel material) and an intensive wall-fluid heat exchange.

Table 1 summarizes selected properties of the gases that are important for waterways. The critical temperature indicates the upper limit up to which a gas can be liquefied. The critical pressure indicates the required pressure slightly below the critical temperature. As can be seen from the Table, the gases methane, oxygen, nitrogen, argon and helium cannot be liquefied under the conditions where water is a liquid, whereas hydrogen sulfide and carbon dioxide can be liquefied. As can also be seen from the Table, the different gases have significantly different vapor pressures, meaning the pressures up to which the condensed gas has its own vapor phase for a given temperature or is present in phase equilibrium in an existing gas mixture.

TABLE 1

Selected properties of real gases

| Physical property | gas | | | | | | |
| --- | --- | --- | --- | --- | --- | --- | --- |
| | $H_2S$ | $CH_4$ | $CO_2$ | $O_2$ | $N_2$ | Ar | He |
| Critical temperature [° C.] | 100.1 | −83 | 31 | −119 | −147 | −122 | −268 |
| Critical pressure [bar] | 89.4 | 46 | 73.8 | 50.4 | 34 | 48.7 | 2.3 |
| Vapor pressure at 21° C. [bar] | 18.2 | — | 58.5 | — | — | — | — |

If the gas traps of the cascade are located at depths so that $CO_2$ is only secondarily converted into the gas phase, then methane in the gaseous phase is effectively separated from $CO_2$ and $H_2S$. A secondary conversion in the context of the present invention may be, for example, that the undesirable gas or gas mixture occurs in the separated gas and/or gas mixture in a concentration that is just not greater than 1-10%. A secondary conversion can also be present if the undesirable gas or gas mixture occurs in the separated gas and/or gas mixture in a concentration that is just not greater than 1-10% of the quantity of this gas or gas mixture originally dissolved in the fluid. In any event, the attainable or required quality of the separation will depend, in addition to the physical properties of the gases, on the composition of the fluidic deposit, its depth, as well as system- and process-specific parameters, and can be controlled by the latter within broad limits. A person skilled in the art is aware of this and will have no problem determining and adjusting the system- and process-specific parameters to optimally operate the system for the intended application. If the outgassing height inside the exploration pipe of the competition of the deposit prevents sufficient separation of the gases/gas mixtures, then methane with definable impurity fractions of $CO_2$ and $H_2S$ can always be produced by using the downstream compressors.

If the methane-depleted water is transported inside the cascade to a height where $H_2S$ is still secondarily outgassed under ambient conditions, a highly enriched $CO_2$ gas phase is produced in the gas trap positioned at that location, while $H_2S$ is not yet converted into the gas phase in significant quantities.

The depths of the gas traps can be easily adjusted for the actual temperature and the adjusted fluid-flow conditions by way of the hypostatic pressure that corresponds to the gas phase pressure $p_g$.

The residual gas which may have as most significant components hydrogen sulfide (it should be noted: $H_2S$ has the highest water solubility among the gases under consideration, followed by $CO_2$) can now be effectively outgassed in a gas trap above the water surface. In addition, the vacuum generated with a vacuum pump in the ascending and/or suspended water column of the reinfiltrating fluid can be used. The water which is now gas-depleted is reinjected by gravity and/or pressed in to an arbitrary depth (because almost force-free) that is determined by geochemical, biological or physical criteria. The separated gases are transported to different pipes/hoses to the exploration platform, where they can be suitably processed further.

The $CO_2$ which has already been liquefied through compression can be returned within the cascade through a separate line to a predeterminable depth with a neutral balance (for example to the bottom of the waterway). The liquefied $CO_2$ has a greater density than water from a depth greater than 3000 m to a temperature of 281.8 K and would have a tendency to sink, accumulate in morphological depressions, enter the rock phase, dissolve and distribute in the adjacent water, as well as be converted by microbes. The $CO_2$ which is diffusely distributed in the ocean water column can thus be efficiently removed from the global ocean circulation and locally concentrated for thousands of years. In addition to storage in the deep sea, introduction into the sea bed is also possible. The heat generated by the dissolution of $CO_2$ in the bottom water can be used, for example, for additional mobilization of methane from hazardous methane hydrate deposits.

Sulfur can be obtained from the separated $H_2S$ reductively (for example through reaction with chlorine).

Accordingly, methods and devices are disclosed with which gas accumulations and greenhouse gases can be efficiently separated (enormous naturally occurring pressure differences+sometimes very high gas solubilities to reach small phase mixture densities) and removed from the global material cycle.

Because the oceans have a large surface (=exchange surface to the atmosphere) as well as a distinct concentration-equalizing circulation, the feasible anthropogenic, i.e., local, intervention in the gas allocation for local "hot-spot" depletion can have a detrimental effect on a stabilization of climate and ocean population.

The device according to the invention has in addition to the pipe system at least one controllable system which is functionally connected with the pipe system in such a way that a selected dynamic pressure in the pipe system and hence a controllable flow from the exploration pipe through the gas trap and onward to the injection pipe can be generated. The controllable system may be a turbine.

Preferably, the turbine has at least one impeller which is axially supported for rotation so that the dynamic pressure in the pipe system can be regulated.

Preferably, all impellers of the turbine are axially supported for rotation.

Preferably, the at least one turbine is constructed such that the turbine removes mechanical energy from the flow system in the presence of an automatic water flow and uses the mechanical energy for power generation.

One or more turbines can be located inside the pipe system. These may cooperate with a corresponding combined motor/generator system and generate a circulation flow through the pipe system. In this way, deep water is moved to a smaller hypostatic pressure level, transported through the gas trap and pressed again through the injection pipes into a selectable water horizon. To the degree to which gas phase separation occurs as a result of the rise, the decreasing phase mixture density causes a buoyancy-related self-reinforcing dynamics. The driving location-specific turbine power can then be reduced accordingly. When the fluid velocity exceeds a critical value, the turbines remove mechanical energy from the fluidic system (dynamic pressure displacement from the outflow side to the inflow side of the turbine) and drive, for example, motors which then supply as generators electric energy. If the inflow surfaces of the impellers of the turbines are axially supported for rotation similar to wind turbines, then the dynamic pressure can be turbine-specifically controlled over a wide dynamic range and the attained rotation energy can be effectively converted into electrical energy by way of a suitable actuating gear. Control of the dynamic pressure allows a depth-dependent control of the outgassing kinetics. For example, turbines located at a low level may derive energy from turbines located at a higher level, and vice versa.

The device according to the invention can be constructed as a mobile operating device. Pipe system and gas trap form a mobile operating system. The device according to the invention may be corrected with an exploration and/or processing platform. The processing platform can be coupled by way of a flexible hose connection. The pipe system is designed/controllable such that the reactive force of the automatic water circulation causes directional movement and rotation of the exploration system. The geometry of the mobile exploration system is then optimized for flow, allowing low-energy autonomous movement. The gas trap(s) can be operated continuously or discontinuously (e.g., also passively via gravity control). For example, in a discontinuous operating process, the gas trap(s) is/are periodically emptied and refilled. However, different gas filling levels in the gas trap change the buoyancy so that periodically different heights in the waterway are addressed. At the same time, the sudden pressure drop in the gas trap after the gas separation valve is opened causes an increase of the pressure difference between the fluid inlets and the gas trap. This effect can be deliberately employed for inducing the phase separation, if the injection pipes have check valves controlled by difference pressure.

The orientation of the pipe end(s) allows their passive positioning (directed movement or rotation). In addition, active drives may be provided.

In a preferred embodiment, the entire device according to the invention is arranged below the water surface.

The invention also relates to a method for selective depletion of gases and/or gas mixtures from fluidic waterway deposits, comprising the steps:
a) receiving the fluid to be depleted,
b) generating suitable first pressure conditions by controllably raising the fluid, whereby a first gas and/or gas mixture is separated from the fluid and converted into the gas phase,
c) moving the fluid into a gas trap and separating the gas phase from the remaining fluid, wherein the pressure conditions in the gas trap are produced by selectively targeting selected depths,
d) optionally moving the separated gas and/or gas mixture into a first gas receiving device,
e) repeating the steps b) to d) at least one more time, wherein in each case additional pressure conditions are produced by selectively targeting selected depths, at which a different gas and/or gas mixture is separated,
f) returning the depleted fluid.

In the method of the invention, the pressure conditions in the gas trap and/or the gas traps are produced by selectively targeting selected depths. In another preferred embodiment of the invention, the pressure conditions in step b) are produced by a combination of selected depths and the controlled dynamic pressure produced by a controllable system, preferably a turbine.

In another preferred embodiment of the method of the invention, a gas trap is positioned at a certain depth such that a desirable gas is enriched in the gas trap to a significant concentration, whereafter the maximum concentration of an undesirable gas in the separated gas phase is determined by the ratio of its vapor pressure to the set gas phase pressure. A concentration may be considered to be significant if the desirable gas includes more than half of the gas phase separated in the gas trap.

In a particularly preferred embodiment of the method according to the invention, a gas trap is positioned at a certain depth such that an undesirable gas or gas mixture is present in the separated gas and/or gas mixture in a quantity that is just below a defined quantity related to the application, for example 1-10%, or such that the undesirable gas or gas mixture is present in the separated gas in a quantity that is just not greater than 1-10% of the quantity of this gas or gas mixture dissolved in the fluid.

The method according to the invention can be implemented by positioning a gas trap at a certain depth so that a desirable gas encompasses more than half of the gas phase separated in the gas trap.

The method of the invention can also be implemented by arranging (optionally cooled) compressors downstream of the gas separation valves of the gas traps, wherein the compressors are operated such that standards for the partial pressures of $CO_2$ (e.g. <5%) and $H_2S$ (e.g. <1%) in the methane flow are always maintained independent of the actual pre-separation of the gases inside the gas traps.

The desired gas is preferably supercritical methane and the undesired gases are the gases $CO_2$ and/or $H_2S$ which can be liquefied under pressure.

A preferred embodiment of the method according to the invention is characterized in that the undesired gas is $CO_2$ and the undesired gas is pressed in at a suitable depth of the fluidic waterway deposit.

In another preferred embodiment of the method according to the invention, gravity-fed gas traps are positioned at certain depths such that $CH_4$, $CO_2$ and $H_2S$ can be optimally separated from one another, wherein the $CO_2$ can be pressed in at a suitable location with neutral balance.

The method according to the invention can be operated continuously or discontinuously.

The invention also relates to uses of the devices and methods according to the invention.

For example, a device according to the invention or a method according to the invention may be used for depleting gases, preferably $CH_4$, $CO_2$ and/or $H_2S$ from waterways, in particular oceans.

The devices and methods according to the invention can be used for preventive water cleanup and for recovering gases from gas-water mixtures residing in waterways.

The devices and methods according to the invention can be used for recovering gases from fluidic deposits with purities that can be largely defined by the user.

Advantages of the Invention

The invention is used for effective control of a spontaneously occurring phase separation. The invention allows the separation of the released gas mixture and the recovery of enriched gas components in suitably positioned gas traps.

From an ecological perspective, the invention is used for depletion of gases ($CH_4$, $H_2S$, $CO_2$) from waterways, in particular deep waterways, such as oceans, and therefore for preventing catastrophic events as well as for long-term reduction of climate-relevant gas flows from the oceans into the atmosphere.

From an ecological perspective, a device and a method are attained which allow the efficient removal of aquatic gas deposits and which is able to convert the kinetic energy of a spontaneously occurring gas-water phase mixture into electric current.

Coupling these ecological/economical aspects and depending on the concrete conditions of the deposit allow a cost-effective/cost-covering method for preventive water restoration—or—an ecologically profitable exploration method which can also be employed in conjunction with the extraction of methane hydrate deposits (recovering extraction losses, separation of gas components, ensuring the operational safety of the methane extraction).

The method is based on technically adapting the described outgassing mechanism of a dissolved gas that exceeds the saturation concentration in a controllable fashion in order to
a) reduce the risk of out-of-control outgassing of deep waters (rehabilitation and ecological aspect),
b) separate different gases efficiently,
c) deplete from the water column climate-relevant gases, such as $CO_2$, with neutral balance and pressing them on the sea bed, thus removing them permanently from the circulation region of the waterway, and
d) efficiently separate additional climate-relevant gases, such as methane and sulfur dioxide, from each other and create advantageous conditions for their separate technical exploitation,
e) provide a technology which allows economical exploration of deep gas accumulations (e.g. for methane) in waterways in the classical sense of extracting a deposit—in this case from a fluidic deposit,
f) which is therefore of importance for the future of the habitat Earth.

By using a compressor which is placed directly downstream of a gas trap having gas separation valves, energy savings can be attained compared to a system with an external remote compressor. A compression of the separated gases will typically be necessary for transporting the gases, for example in a pipeline, away from the production platform. This compression is typically initiated only after the gases have been recovered. If compression is already performed directly after separation, then only a difference pressure which compensates for the difference between the transport pressure and the pressure in the gas trap needs to be built up in the compressor.

The invention claimed is:

1. A device for depletion of gases from waterways, comprising:
a pipe system, which comprises
i) an exploration pipe for receiving a fluid containing the gases,
ii) an injection pipe for returning the fluid depleted of the gases, and
iii) at least one gas trap which is arranged in the device such that a selected pressure can be generated in the gas trap, wherein the gas trap is functionally connected with both the exploration pipe and the injection pipe such that the fluid can be transferred from the exploration pipe via the gas trap into the injection pipe and the gas trap is configured so as to be functionally connectable with a gas receiving device;
wherein the pipe system has a plurality of gas traps, wherein
I) the gas traps are connected with both the exploration pipe and the injection pipe such that the fluid can be transferred from the exploration pipe via the gas traps into the injection pipe,
II) the gas traps are arranged at certain distances vertically on top of one another and relative to a fluidic deposit to be depleted and are functionally connected with one another such that the fluid rising from the exploration pipe reaches a first gas trap having a pressure level at which a first gas or gas mixture is separated, subsequently the enriched fluid reaches a second gas trap which also has a predetermined pressure level, in which a second gas/gas mixture is separated, wherein the first pressure and the second pressure are different from each other, and
III) the individual gas traps are each functionally connectable with one or several gas receiving devices or the gas traps in one or more groups are connectable with a common gas receiving device.

2. The device according to claim 1, wherein the device comprises additionally at least one controllable system, which is functionally connected with the pipe system in such a way that a selected dynamic pressure in the pipe system and hence a controllable flow from the exploration pipe, through the gas trap, and up to the injection pipe can be generated.

3. The device of claim 2, wherein at least one controllable system is a sleeve which is functionally connected with the device such that the diameter can be controllably tapered at at least one location in the pipe system.

4. The device of claim 2 wherein at least one controllable system is a turbine.

5. The device according to claim 1, wherein the selective pressure in one, several or all gas traps can be generated by defining the height position of the respective gas trap above the fluidic deposit to be depleted.

6. The device according to claim 1, wherein one, several or all gas traps are located below the water level.

7. The device according to claim 1, wherein the pipe system is at least partially coated with a hydrophobic material.

8. A method for selective depletion of gases or gas mixtures from fluidic waterway deposits, comprising the steps of:
a) receiving the fluid to be depleted,
b) generating suitable first pressure conditions by controllably raising the fluid, whereby a first gas or gas mixture is separated from the fluid and converted into the gas phase,
c) transporting the fluid into a gas trap and separating the gas phase from the remaining fluid, wherein the pressure conditions in the gas trap are produced by selectively targeting selected depths,
d) optionally moving the separated gas or gas mixture into a first gas receiving device,
e) repeating the steps b) to d) at least one more time, wherein in each case additional pressure conditions are produced by selectively targeting selected depths, at which a different gas or gas mixture is separated,
f) returning the depleted fluid.

9. The method according to claim 8, wherein a gas trap is positioned at a depth such that a desirable gas is enriched to a significant degree in the gas trap, whereby the maximum concentration of an undesirable gas in the separated gas phase is determined by the ratio of its vapor pressure to the set gas phase pressure.

10. The method according to claim 9 wherein the desirable gas is methane and the undesirable gas is $CO_2$ or $H_2S$.

11. The method according to claim 8, further comprising gas traps positioned at certain depths so that $CH_4$, $CO_2$ or $H_2S$ can be selectively separated from each other.

12. The method according to claim 9 wherein the undesirable gas is $CO_2$ and the undesirable gas is pressed in at a certain depth of the fluidic waterway deposit.

* * * * *